M. B. RYAN.
ELECTRIC CHAIN WELDING MACHINE.
APPLICATION FILED JUNE 20, 1906. RENEWED SEPT. 8, 1911.
1,023,127.
Patented Apr. 16, 1912.
3 SHEETS—SHEET 1.
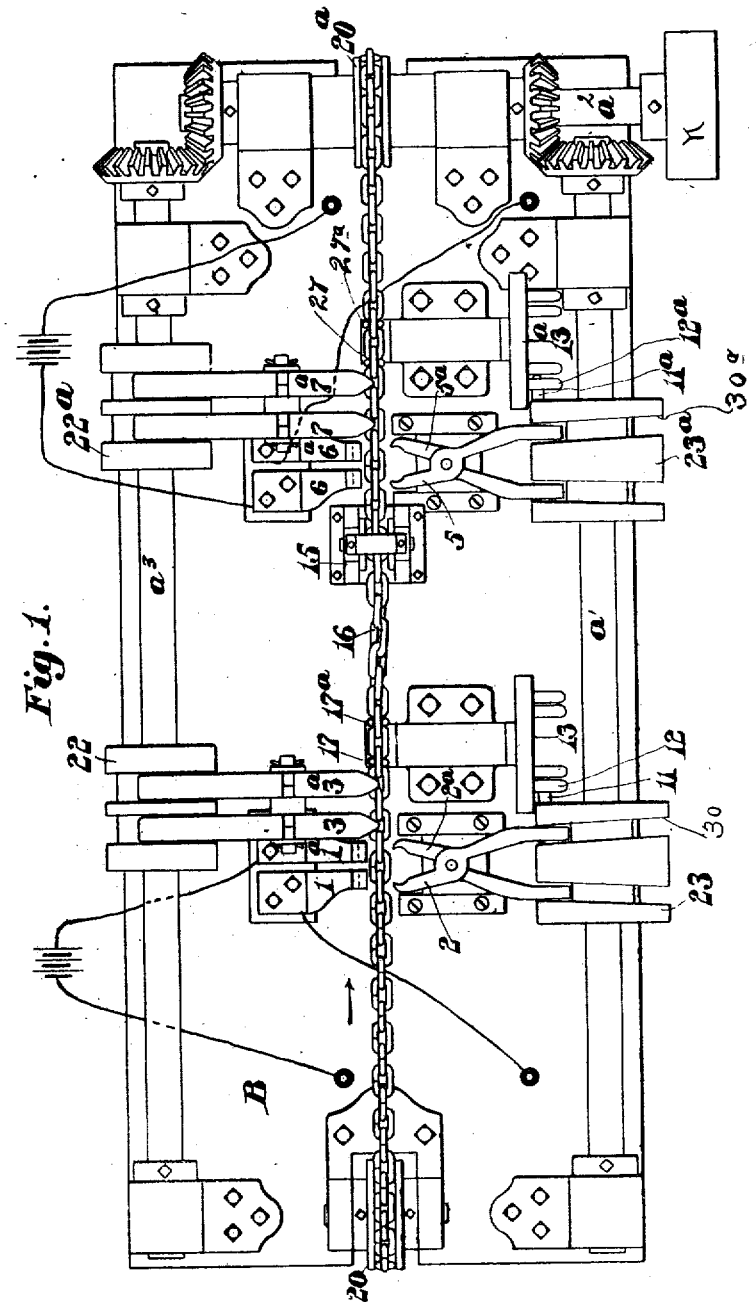
Witnesses:
Walter E. Lombard
Nathan C. Lombard
Inventor:
Michael B. Ryan

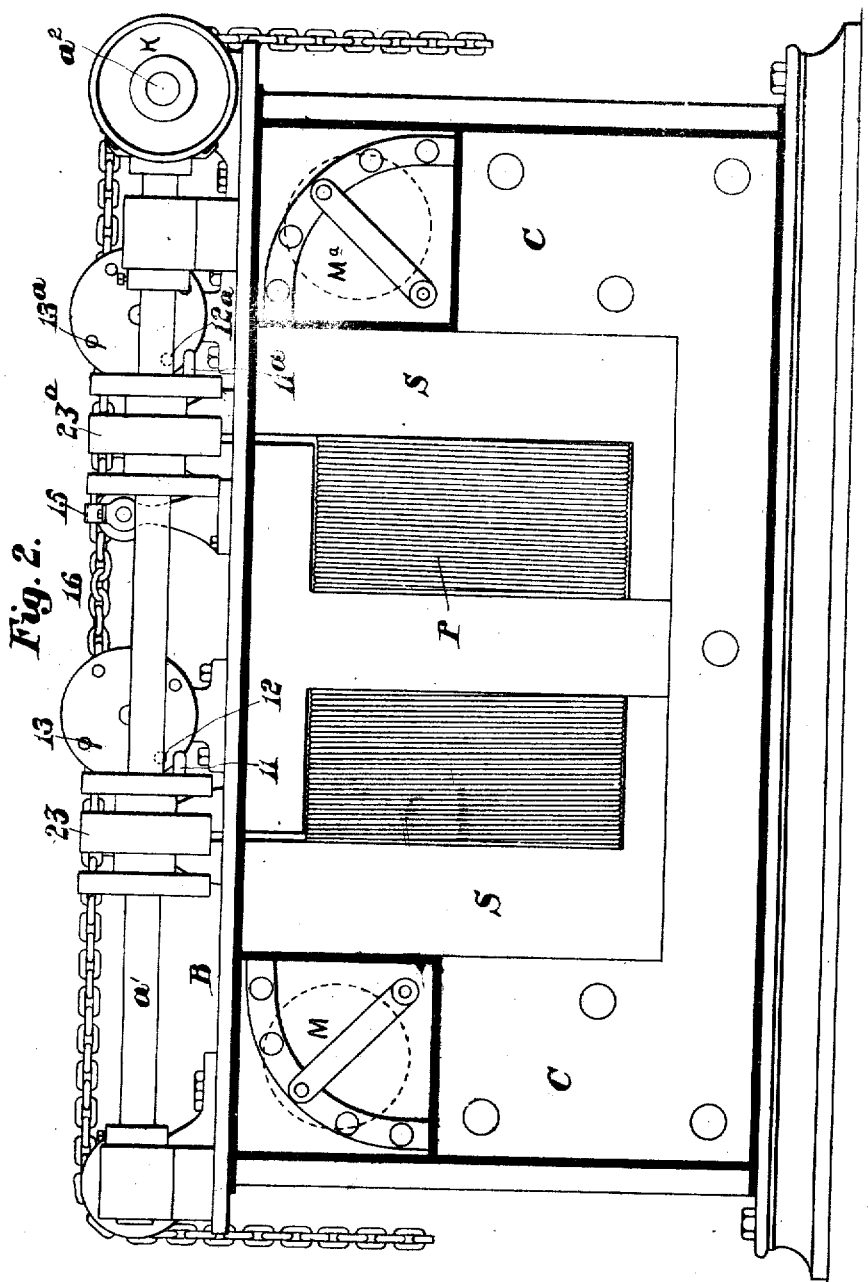

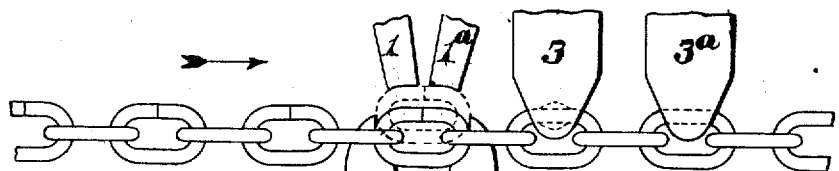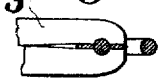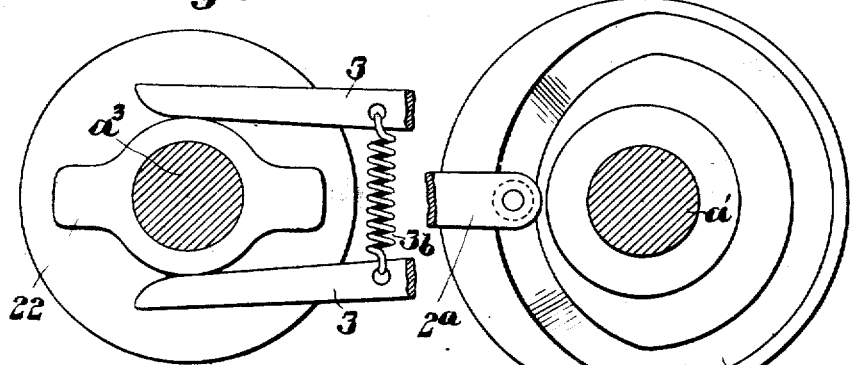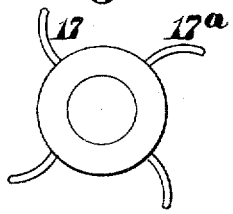

UNITED STATES PATENT OFFICE.

MICHAEL B. RYAN, OF BOSTON, MASSACHUSETTS, ASSIGNOR, BY MESNE ASSIGNMENTS, TO THE AUTOMATIC CHAIN COMPANY, OF BUFFALO, NEW YORK, A CORPORATION OF NEW YORK.

ELECTRIC CHAIN-WELDING MACHINE.

1,023,127.      Specification of Letters Patent.      Patented Apr. 16, 1912.

Application filed June 20, 1906, Serial No. 322,590. Renewed September 8, 1911. Serial No. 648,395.

*To all whom it may concern:*

Be it known that I, MICHAEL B. RYAN, a citizen of the United States, residing at No. 206 Massachusetts avenue, in the city of Boston, in the county of Suffolk and State of Massachusetts, have invented certain new and useful Improvements in Electric Chain-Welding Machines, of which the following is a specification.

The object of my invention has been to provide an electric chain welding machine that shall be simple and efficient, and that shall have any or all of the advantages hereinafter specified; and to such ends my invention consists in the electric chain welding machine hereinafter specified.

In the accompanying drawings Figure 1 is a plan view of a machine embodying my invention; Fig. 2 is a side elevation; Fig. 3 is an enlarged view of the electrodes, tongs and bur-removing jaws operating upon a section of chain; Fig. 4 illustrates a chain link as it appears after it has been welded, and before the bur has been removed therefrom; Fig. 5 is a side elevation of the jaws which perform the first operation of removing the bur, a link being shown in said jaws in section; Fig. 6 is a plan view of a link in the condition shown in Fig. 5; Fig. 7 is a side elevation of the jaws which perform the last operation of removing the bur from the link, a link being shown in section in such jaws; Fig. 8 is a view of the rear ends of a pair of bur-removing jaws, and one of the cams for operating such jaws; Fig. 9 is a side elevation of one of the cams for operating the link-squeezing jaws, together with a portion of the rear end of one of such jaws; and Fig. 10 is a side elevation of one of the chain-feeding wheels.

In automatic welding machines as heretofore constructed, so far as I am aware, the following difficulties among others have been met with. The supply of current to the joint to be welded has been irregular so that it has not been feasible to automatically present and feed the parts to be welded to the electrodes. If the time of the feeding movements is constant and the supply of current is irregular, it is obvious that the result of the welding will be irregular. In all welding machines having means for forcing the parts to be welded together, or for permitting such movement, prior to my invention, so far as I know, there has been irregularity of supply of current due to either or both of two causes: First, in order to permit such movement, one of the electrodes has been movable, and a sliding joint has been formed somewhere in the electric circuit to permit such movement. As the resistance of a sliding joint to a current of low voltage varies with every movement of the parts, an irregularity of supply has resulted. Second: the perfection of contact between the parts to be welded and the electrodes affects the supply of current to the welded joint. Prior machines have had electrodes movable upon the frame of the machine, and therefore when the two parts to be welded have been forced against the electrodes, there has either been sufficient irregularity of position, due to the movability of the parts, or there has been sufficient weakness of the electrodes, so that the work to be welded could not be forced against them with that degree of pressure which is necessary to a commercially perfect contact. These difficulties have made it necessary that an operator should watch the welding operation and control the supply of current by hand. As the heating of light articles such as chain takes place very quickly, the operator is frequently unable to control the current quick enough and an imperfect link occurs. Moreover, the operator's attention necessarily grows lax in the constant effort to watch the welding, and from this cause also imperfect welds frequently occur. The seriousness of these defects will be apparent when it is remembered that one imperfect link will, unless replaced, render an entire chain useless. My machine is designed to overcome these difficulties among others.

As hereinafter pointed out, my invention is a very broad one, and it is capable of embodiment in many different forms. That form of my invention which I have illustrated is one which I regard as the best form thereof, but it is to be understood that such form is only chosen for the purpose of illustration, and that my invention is not to be confined to this specific embodiment thereof.

The machine which I illustrate herein is especially adapted to weld the links of a chain formed by a chain making machine, which cuts the link blanks from a wire rod, threads each blank through the previously formed link and bends the blank so as to form a butt joint in the middle of the side thereof. The chain thus made has its links formed in two planes perpendicular to each other. All the joints of the links in a given chain occur on the same side of the chain, so that there are but two of the four exposed edges of the links that it is necessary to weld.

In my said machine, the parts are mounted upon a table-like frame. Beneath the table is a transformer, the particular type of which is not involved in my invention. As illustrated, the transformer consists of a secondary S secured to the underside of the table, a primary P, and the usual laminated iron core. Rheostats or reactive coils, M, $M^a$ are provided to control the current to each of the two pairs of electrodes about to be described. On the upper surface of the table are two pairs of electrodes 1 and $1^a$ and 6 and $6^a$. These electrodes are rigidly fastened upon the secondary of the transformer and are insulated from each other. I desire to emphasize the fact that the electrodes are rigidly fastened upon the transformer as this is a most important feature of my invention, and shall later point out its advantages. There is no movement of the electrodes relative to the secondary, and the electrodes in the illustrated form are absolutely stationary on the frame of the machine. The forward edges of the electrodes may, as usual, be grooved to partially fit the rounded surface of the chain link.

The movable parts of the machine are driven from the driving shaft $a^2$ which is mounted in bearings on the table, and which is provided with a belt pulley K or other means for driving it. The said shaft is provided with a chain wheel $20^a$, over which the completed chain passes. The chain is led to the chain wheel $20^a$ from a driving wheel 27 having pairs of fingers $27^a$ which engage the chain between the horizontal links. In reaching the driving wheel the chain passes in front of, but normally out of contact with, the electrodes 6 and $6^a$ and through a stationary guiding bracket 15 fastened upon the table, the bracket having an opening therethrough of the shape of the cross section of the chain so that the chain may pass through but cannot twist on its axis. The chain reaches the bracket 15 from a driving wheel 17, the latter having fingers $17^a$, which, like the fingers $27^a$, engage the chain between its horizontal links. In reaching the driving wheel 17 the chain passes in front of but normally out of contact with the electrodes 1 and $1^a$. The chain enters the machine over a guiding wheel 20 that is mounted in bearings on the table.

The shafts of the driving wheels are provided with disks 13 and $13^a$ on their ends opposite those carrying the driving wheels, each of which disks has a series of pins 12 and $12^a$ projecting therefrom, there preferably being four of such pins. The pins 12 and $12^a$ are respectively engaged by pins 11 and $11^a$ projecting from the sides of cam bodies 23 and $23^a$, the latter being mounted upon a shaft $a'$ that is journaled in bearings along the front edge of the table, the said shaft being driven from the driving shaft by beveled gears. Thus for every revolution of the shaft $a'$ the driving wheels are advanced one-quarter of a turn, the distance from one link to another in a given plane.

In order to force the particular links to be welded against the stationary electrodes, and also to squeeze them together at the joint, the following means are provided: Opposite the electrodes 1 and $1^a$ a pair of jaws 2 and $2^a$ is pivoted upon a slide that is mounted in guides on the table so as to be movable toward and from the electrodes. The said jaws are preferably concaved so as to fit the link being engaged. At their rear ends, the jaw levers, as illustrated in Fig. 9, are provided with anti-friction rolls which engage path cams in the cam body 23, the cams being so shaped that the jaws will have both a movement toward the electrodes and a closing movement toward each other, as will be later described. A pair of jaws 5 and $5^a$ is provided for the electrodes 6 and $6^a$ and such jaws are constructed like the jaws 2 and $2^a$ and have the same motions.

In order to provide for removing the bur formed by the welding operation, as illustrated in Fig. 4, two pairs of bur-removing jaws are provided immediately beyond (in the direction of travel of the chain) each pair of electrodes. A pair of jaws 3 is pivoted on a vertical bracket on the table at the distance of one link from the electrodes 1 and $1^a$, such jaws having a vertical movement and being shaped, as shown in Fig. 5, to squeeze the bur to a flat fin on each side of the link. The jaws 3 are operated, as illustrated in Fig. 8, by a cam 22 on the shaft $a^3$, the latter being journaled in bearings on the table and driven by beveled gearing from the driving shaft. At the further distance of a link (in the travel of the chain) beyond the jaws 3, a pair of jaws $3^a$ is pivoted, the jaws having a vertical movement. The jaws $3^a$ are shaped as illustrated in Fig. 7, such jaws having sharp edges which bite off the fins formed by the jaws 3. The jaws 3ª are likewise operated by cams on the rear shaft $a^3$. For the electrodes 6 and 6ª a pair of jaws 7 is provided, similar to the jaws 3, and a pair of jaws 7ª, similar to the jaws 3ª.

In the operation of the illustrated embodiment of my invention, the chain is led over the wheels 20 and 17, the jointed sides of one set of links facing the electrodes 1 and 1ª. The chain is then given a quarter turn, as illustrated in Fig. 1, to bring the jointed sides of the set of links which were perpendicular to the electrodes 1 and 1ª into a horizontal position so that they will pass in front of the electrodes 6 and 6ª, and the chain is then led through the bracket 15, across the driving wheel 27 and over the chain wheel 20ª. The machine is then set in motion and the jaws 2 and 2ª advance and engage the ends of the horizontal link in the front of the electrodes 1 and 1ª, the jaws for this purpose passing through the vertical links which are threaded through the said horizontal link. The jaws then press the horizontal link against the electrodes 1 and 1ª and hold it firmly there, the rounding of the jaws permitting the link to shift itself so that it can bear firmly against both electrodes. The induced current in the secondary of the transformer passes through the electrodes and through the joint to be welded and heats and softens the metal. When the metal has become softened, the jaws 2 and 2ª are squeezed together by the shape of their operating cams so that the ends of the link at the weld are forced together to make a perfect weld. The jaws are closed together and caused to squeeze the link, because the portions of the cams 23 and 23ª which are received between the rear ends of the jaw levers are thicker (that is, have greater dimension in a direction parallel to the shaft) at the point where such squeezing is to be effected, and the passage of this thicker portion between the rear ends of the jaw levers spreads such rear ends apart and forces the jaws closer together. This squeezing of the link causes a bur to be formed about the weld, as illustrated in Fig. 4. The weld having been perfectly formed, the jaws 2 and 2ª are opened and retracted and the chain is fed the distance of one link to another of the horizontal series by the feed wheel 17. This brings the freshly welded link between the jaws 3, and while the next link is being welded, the said jaws flatten the bur to form fins on each side of the link, as illustrated in Fig. 5. The jaws 3 as well as the jaws 2 and 2ª then open and the chain is fed again the distance of one link, bringing the link which was acted upon by the jaws 3 between the jaws 3ª.

As the second preceding link is welded and the next preceding link being acted upon by the jaws 3, the jaws 3ª pinch off the fins formed by the jaws 3, as illustrated in Fig. 7. As the chain passes over the feed wheel 17 to the bracket 15, it turns one-quarter of a turn, thus bringing the links which were vertical in passing the electrodes 1 and 1ª (and which therefore were not welded by such electrodes) to a horizontal position in which they can be welded by the electrodes 6 and 6ª. The electrodes 6 and 6ª and the jaws 7 and 7ª act upon the second series of links in the same manner as the first series were acted upon by the previous electrodes and jaws, so that when the chain leaves the machine, all the links of both series are welded and have had their burs removed.

The machine above illustrated has proved to be a thoroughly practical machine for automatically welding chain, and it has features and advantages which are applicable to welding machines for many other purposes. Among others it has the following advantages: The electrodes are stationary with reference to the secondary of the transformer so that the welding current does not pass through any sliding joints. That this is a very advantageous feature will be seen from the following considerations: For welding, a current of very large quantity is necessary, and as the cost of the current is proportional to the product of the voltage and amperage, it is evident there is economy in keeping the voltage as low as possible. If the current has to pass through a sliding joint, the voltage must necessarily be higher than if there is a stationary joint. No matter how perfect the surfaces of the sliding joint may appear to be, they are really rough, and contact differently every time they are moved. Some scale is formed at each contact and the air in the joint increases the resistance. Therefore with a movable contact there is necessarily used a higher voltage than with my stationary contact. It is not only desirable on account of economy to use a low voltage, but if the voltage is above a certain degree, the current will spit or burn out at the joint, and weld and a less perfect weld is obtained. The varying of the successive contacts varies the available current so that much less uniformity of current is obtainable at the electrodes with a movable contact than with my stationary contacts. This is particularly so because of the low voltage which is necessarily used. In my said machine it is only necessary to pass chain through the machine once. All the joints of both the horizontal and vertical links are welded in once passing through the machine. As the operations of removing the fin are performed after the link leaves the electrodes, no time is wasted at the electrodes for these operations, and the electrodes, being devoted solely to welding, can weld a larger number of links in a given time than if the bur were removed in front of the electrodes. The natural spring in the copper of the electrodes will permit a certain amount of adaptation to any irregularity in the shape of the link or in the manner of presentation to the electrodes. As the electrodes are or may be rigidly fastened upon the frame of the machine, the link to be welded can be forced against the electrodes with sufficiently great pressure to insure that the contact of the link with both electrodes shall be sufficiently perfect. If the link failed to touch one of the electrodes by the slightest space, it would be fatal to the success of the weld, because it would afford a relatively very high resistance to the low voltage current. As my machine insures a substantially constant resistance to the working current, uniformity of welding is made possible, and therefore it is possible to automatically feed the work to be welded, and yet to get commercially satisfactory work. In fact, for welding light articles, such as chain, I believe my machine will produce work superior to a machine in which the current is controlled by the operator.

I claim:

1. In an electric welding machine, the combination of stationary electrodes, and means for pressing the end portions of a metal piece forming a closed figure against the electrodes with the joint of said end portions between said electrodes.

2. In an electric welding machine, the combination of a transformer, electrodes stationary relative to each other and to the secondary of the transformer, and means for moving the end portions of a metal piece forming a closed link or figure into contact with the stationary electrodes with the joint of said end portions between the electrodes.

3. In an electric welding machine, the combination of a transformer, electrodes stationary relative to the secondary of the transformer, and means for pressing the work against the electrodes and for longitudinally squeezing the parts to be welded together.

4. In an electric welding machine, the combination of a transformer, electrodes stationary relative to the secondary of the transformer, means for pressing the work against the electrodes and for moving the parts to be welded toward each other substantially parallel to the faces of the electrodes.

5. In an electric welding machine, the combination of stationary electrodes, and jaws movable toward said electrodes and toward each other.

6. In an electric chain welding machine, the combination of stationary electrodes, and means for pressing the chain against said electrodes and for feeding the chain.

7. In an electric chain welding machine, the combination of two sets of electrodes, link holding devices, and means for causing the chain to be given a quarter turn in passing from one to the other of said sets.

8. In an electric chain welding machine, the combination of means for welding one set of links of a chain, and means for welding the links perpendicular to said set, and means for turning said chain after the action of one welding means to present it to the action of the other welding means.

9. In an electric chain welding machine, the combination of two sets of electrodes, means for bringing links of a chain into contact with said electrodes, and a chain guide between said electrodes for guiding said chain.

10. In an electric chain welding machine, the combination of stationary electrodes, a slide movable toward and from said electrodes, jaws movable upon said slide, and cams for moving said jaws to carry a chain link against said electrodes and for then squeezing said link.

11. In an electric chain welding machine, the combination of two sets of electrodes, and means for causing each of said electrodes to act upon every other one of the links of a chain, one of said electrodes acting upon the links not acted upon by the other of said electrodes.

12. In an electric chain welding machine, stationary electrodes insulated from each other, against which the joint to be welded is pressed, means so to press the joint against said electrodes, and means for feeding the chain past the electrodes.

13. In an electric chain welding machine, stationary electrodes insulated from each other to engage opposite sides of the joint to be welded, and suitable means firmly to press said joint against said electrodes, in combination with means to give sufficient end pressure to the link to upset the heated ends.

14. In a machine for welding chain by electricity, the combination of the stationary electrodes, tongs for advancing the joint to be welded to the electrodes, and giving the desired end pressure to upset the heated joint, means for flattening out the bur to fin shape, and means for removing the fins as described.

15. In an electric chain welding machine, stationary electrodes combined with means for feeding a chain past the electrodes and means for causing the work to approach toward and to recede therefrom at right angles to the path of the feed of the chain past the electrodes.

16. In an electric welding machine, the combination of a stationary secondary circuit comprising electrodes, and power operating means acting automatically to hold the work against the electrodes a predetermined time.

17. In an electric chain welding machine, the combination of a stationary secondary circuit comprising electrodes, means for feeding the chain past the electrodes, and means for causing the work to approach toward and recede from the electrodes of said circuit at right angles to the path of feed of chain past the electrodes.

18. In an electric chain welding machine, means for feeding the chain, combined with two sets of electrodes arranged with a space between them, means for causing the joints of certain links to be presented for welding to the first set of electrodes, and means for causing the joints of the links perpendicular to the first-named links to be presented for welding to the second set of electrodes.

19. In an electric chain welding machine, means for feeding the chain, combined with two sets of electrodes arranged with a space between them, means for causing the joints of certain links to be presented for welding to the first set of electrodes, and means for imparting a quarter turn to the chain during its passage through said space, whereby the joints of the links perpendicular of the first-named links are presented for welding to the second set of electrodes.

20. In an electric chain welding machine, means for feeding the chain horizontally, combined with two sets of electrodes arranged with a space between them and means for imparting a quarter turn to the chain during its passage through said space, whereby the links occupying a vertical position at the first set of electrodes are caused to occupy a horizontal position at the second set of electrodes.

21. In an electric welding machine, the combination of a frame, electrodes rigidly fastened to said frame, means for supplying electricity to said electrodes, said electrodes having their working faces substantially in line with each other, and means for forcing the work to be welded against said working faces and for holding the work with the joint of the ends to be welded disposed between the two electrodes.

22. In an electric welding machine, the combination of a frame, electrodes rigidly fastened to said frame, means for supplying current to said electrodes, said electrodes being placed side by side but out of electric contact with each other, and automatic means for forcing the work simultaneously against both of said electrodes with the joint disposed between the two stationary electrodes.

23. In an electric welding machine, the combination of a frame, electrodes rigidly fastened side by side upon said frame, means for supplying current to said electrodes, and means movable substantially perpendicular to the working faces of said electrodes for forcing the ends of a bent wire or rod forming a closed figure or link against said faces, with the joint between said electrodes.

24. In an electric welding machine, the combination of a frame, electrodes rigidly secured to said frame, a transformer having its secondary rigidly secured to said electrodes, said electrodes having their working faces side by side, and means also carried by said frame for forcing the work against said faces, with the joint to be welded disposed between said electrodes.

25. In an electric welding machine, the combination of a frame, electrodes rigidly secured to said frame, means for supplying current to said electrodes, seats formed in the working faces of said electrodes to receive a ring, and means for forcing a ring toward said electrodes and into said seats, and means for squeezing the joint of the ring together while being welded.

26. In an electric welding machine, the combination of a frame, electrodes rigidly secured to said frame, means for supplying current to said electrodes and means for forcing the ends of a wire forming a closed figure against the said electrodes with the joint between said electrodes, said means acting substantially perpendicular to the working faces of said electrodes.

27. In an electric welding machine, the combination of a frame, electrodes rigidly secured to said frame, means for supplying current to said electrodes, and means for forcing the ends of a wire forming a closed figure against the said electrodes with the joint between said electrodes and for squeezing the joint of the work together, said means acting substantially perpendicular to the working faces of said electrodes.

28. In an electric welding machine, the combination of a frame, electrodes rigidly fastened thereto side by side, means for supplying current to said electrodes, seats formed in the working faces of said electrodes to receive a round article to be welded, and means for forcing the said article against said electrodes.

29. In an electric chain welding machine, the combination of two sets of electrodes, the working faces of said electrodes of each set being substantially in line with each other, means for feeding chain past said electrodes in the general direction of their working faces, and means for imparting a quarter turn to the chain between the two sets of electrodes.

30. In an electric chain welding machine, the combination of two sets of electrodes, the working faces of said electrodes of each set being substantially in line with each other, means for feeding the chain in the general direction of said working faces, and means for imparting a quarter turn to the chain between the two sets of electrodes.

31. In an electric chain welding machine, the combination of a frame, two sets of electrodes rigidly fastened to said frame, two transformers, each transformer having its secondary rigidly fastened to one of said sets of electrodes means for forcing the chain against said electrodes, and means for feeding the chain past said electrodes.

32. In an electric chain welding machine, the combination of a frame, two sets of electrodes rigidly fastened thereto, two transformers, each having its secondary rigidly fastened to one of said sets of electrodes, the working faces of said electrodes being substantially parallel to the path of the chain through the machine, means acting transversely to said path to force the chain against said electrodes, and means for feeding the chain past said electrodes.

33. In an electric chain welding machine, the combination of a frame, two sets of electrodes rigidly fastened thereto, two transformers, each having its secondary rigidly fastened to one of said sets of electrodes, the working faces of said electrodes being substantially parallel to the path of the chain through the machine, means acting transversely to said path to force the chain against said electrodes, and means for feeding the chain past said electrodes, and means for imparting a quarter turn to the chain between the two sets of electrodes.

34. In an electric welding machine, the combination of a frame, a transformer, electrodes side by side and connected to the secondary of said transformer said parts being stationary relatively to each other, a holder for the work, and means for relatively moving said electrodes and work-holder toward each other to contact the work with said electrodes.

35. In an electric welding machine, the combination of a supporting frame, two sets of electrodes and corresponding sets of link holding devices, said sets of electrodes and holding devices being spaced apart on the supporting frame to accommodate a plurality of links of chain between them and permit the chain to be given a quarter turn in passing from one to the other of said sets of electrodes, and a guide for directing the chain to the second set of electrodes.

36. In an electric welding machine, the combination of two guides, two sets of stationary electrodes and two sets of link holding and feeding devices, said sets of stationary electrodes being spaced apart to accommodate a plurality of chain links between them and permit the chain to be given a quarter turn in passing from one to the other set of electrodes that alternate links may be welded by each set of electrodes, and means for moving the sets of link holding means to carry the links against their respective stationary electrodes.

37. In an electric welding machine, the combination of means including stationary electrodes for welding one set of links of a chain, means including stationary electrodes for welding another set of links of the chain, and means for moving the links against their respective stationary electrodes.

38. In an electric welding machine, the combination of two sets of welding devices, means for presenting every other link to one of said welding devices, and means for presenting the intermediate links to the other of said welding devices.

39. In an electric welding machine, the combination of two sets of welding devices, means for causing one of said sets of welding devices to operate upon a link of a chain, and means for causing the other set of welding devices to simultaneously operate upon a link of the chain separated an odd number of links from the first-named link.

40. In an electric welding machine, the combination of a frame, a transformer, stationary electrodes side by side and connected to the secondary of said transformer, a holder for the work, and means for moving said work-holder to carry the work against the electrodes and force the welding ends together.

41. In an electric chain link welding machine, the combination with the movable carriage and link gripping jaws mounted on and movable with the carriage, of the fixed welding electrodes constituting the circuit terminals and forming a seat between them for the end of the link which is held and advanced by the carriage.

42. In an electric chain link welding machine, the combination with the reciprocatory carriage and reciprocatory link gripping jaws mounted on the carriage and movable therewith, of welding electrodes mounted in fixed position and forming a seat between them for the end of the link held by the jaws and advanced by the movement of the carriage.

43. In an electric chain link welding machine the combination with a movable holding mechanism for the link, of a transformer having fixed terminal electrodes forming a seat between them for the end of a link held and advanced by the movement of the holder.

44. In an electric chain link welding machine, the combination with a reciprocatory holding mechanism for the link embodying gripping jaws, of a transformer having fixed terminal electrodes forming a seat between them for the end of a link held by the gripping jaws.

45. In an electric chain link welding machine, the combination with the terminal electrodes forming a seat between them for the end of a link, of means for gripping and moving a link into contact with the electrodes and dies for giving shape to the weld while the link is out of contact with the electrodes.

In testimony whereof I have affixed my signature, in presence of two witnesses.

MICHAEL B. RYAN.

Witnesses:
JOHN G. GARRAWAY,
JOHN MACINTOSH.